Patented Feb. 1, 1949

2,460,788

UNITED STATES PATENT OFFICE 2,460,788

PRODUCTION OF METHACRYLONITRILE AND ALPHA-CHLORO ISOBUTYRONITRILE

Le Roy U. Spence, Elkins Park, Pa., and Emile H. Sakal, Brooklyn, N. Y., assignors to Röhm & Haas Company, Philadelphia, Pa., a corporation of Delaware No Drawing. Application September 3, 1947, Serial No. 772,012

3 Claims. (Cl. 260—465.7)

The present invention relates to an improved process whereby methacrylonitrile may be economically produced.

It is known that tri-α-cyanoisopropyl phosphite may be produced in high yield by reacting acetone cyanohydrin with phosphorus trichloride. According to this invention, tri-α-cyanoisopropyl phosphite is chlorinated to form tri-α-cyanoisopropyl dichlorophosphate which, in turn, is pyrolyzed to form methacrylonitrile and chloroisobutyronitrile. The chloroisobutyronitrile can be converted into valuable compounds by known methods, for instance, to chloroisobutyric acid esters; or, by splitting out hydrogen chloride, methacrylonitrile may be formed. Thus, methacrylonitrile may be obtained in yields substantially higher than have been previously obtained.

In carrying out this process, α-cyanoisopropyl phosphite, produced, for example, as shown by Chraszewski and Sobieranski (C. A. 22, 2146), is taken and chlorine is passed therethrough while the temperature of the reaction is maintained within the range from about 20° C. to about 30° C. by cooling, if necessary. When absorption of chlorine is completed, any unreacted chlorine is removed from the reaction product by passing therethrough a current of dry inert gas, such as air, carbon dioxide, nitrogen, or the like. The reaction product thus formed is then heated to a temperature of the order of 200° to 300° C., whereupon the product is decomposed, yielding methacrylonitrile and chloroisobutyronitrile in the ratio of approximately two mols to one. The yield is improved by pyrolyzing in a high-boiling organic liquid, such as diphenyl oxide, diphenyl, chlorinated paraffins, chlorinated naphthalenes, and the like. These high-boiling liquids are sufficiently higher boiling than the products formed by pyrolysis to permit ready separation of the products by distillation.

Instead of pyrolyzing in the presence of a high-boiling liquid, the yields may also be improved by rapidly heating the reaction product to the decomposition temperature and allowing the volatile decomposition products to escape so rapidly that little or no contact between the phosphoric acid which forms and the ultimately desired products occurs. In this way, hydrolysis is avoided. In this case, a lower-boiling liquid, such as chloroform, carbon tetrachloride, ethylene dichloride, may be utilized to advantage to assist in the more rapid removal of the desired products.

This invention may be more clearly understood from the following illustration:

Tri-α-cyanoisopropyl phosphite was prepared by mixing six mols of acetone cyanohydrin, two mols of phosphorus trichloride, and ten mols of anhydrous benzene and refluxing the mixture for five hours. During refluxing, hydrogen chloride was evolved until the reaction was complete. Upon completion of the reaction, the benzene solution was cooled and thoroughly washed with water. The product was dried and further purified by heating to 140° C. at 25 mm. pressure. The residual α-cyanoisopropyl phosphite was a clear, light-green liquid having a refractive index, $N_D^{12}=1.4468$, in a yield of 81.5% based on the acetone cyanohydrin used.

Chlorine gas was slowly bubbled through the residual product prepared as above noted until heat was no longer evolved, the temperature being maintained within the range of from 20° to 25° C. by cooling. Excess chlorine was removed from the reaction product at room temperature under reduced pressure. The resulting tri-α-cyanoisopropyl dichlorophosphate was taken up in diphenyl oxide and was heated sufficiently to keep the liquid boiling gently. Ebullition began at 150° C., and at 180° C. decomposition was rapid and the volatile material began to distil. Heating was continued until a temperature of 260° C. was reached. The distillate contained 80% nitriles by nitrogen analysis.

We claim:

1. The process of preparing methacrylonitrile and α-chloroisobutyronitrile which comprises reacting tri-α-cyanoisopropyl phosphite with chlorine and pyrolyzing the resulting product to form nitriles.

2. The process of preparing methacrylonitrile and α-chloroisobutyronitrile which comprises reacting tri-α-cyanoisopropyl phosphite with chlorine at a temperature within the range from about 20° C. to about 30° C., and thereafter pyrolyzing the resulting product at a temperature from about 200° C. to about 300° C., for sufficient length of time to cause substantial conversion thereof to nitriles.

3. The process of preparing methacrylonitrile and α-chloroisobutyronitrile which comprises reacting tri-α-cyanoisopropyl phosphite in an inert solvent with chlorine at a temperature within the range from about 20° C. to about 30° C., and thereafter pyrolyzing the resulting product in the presence of an inert organic liquid at a temperature from about 200° C. to about 300° C., for a time sufficient to cause substantial conversion thereof to nitriles.

LE ROY U. SPENCE.
EMILE H. SAKAL.

REFERENCES CITED

The following references are of record in the file of this patent:

UNITED STATES PATENTS

| Number | Name | Date |
| --- | --- | --- |
| 2,174,756 | Pieroh | Oct. 3, 1939 |
| 2,210,320 | Kautter et al. | Aug. 6, 1940 |
| 2,265,814 | Ritchie et al. | Dec. 9, 1941 |